July 10, 1951 R. C. MANSPERGER 2,559,725
TRIMMING DEVICE
Filed April 30, 1949 2 Sheets-Sheet 2

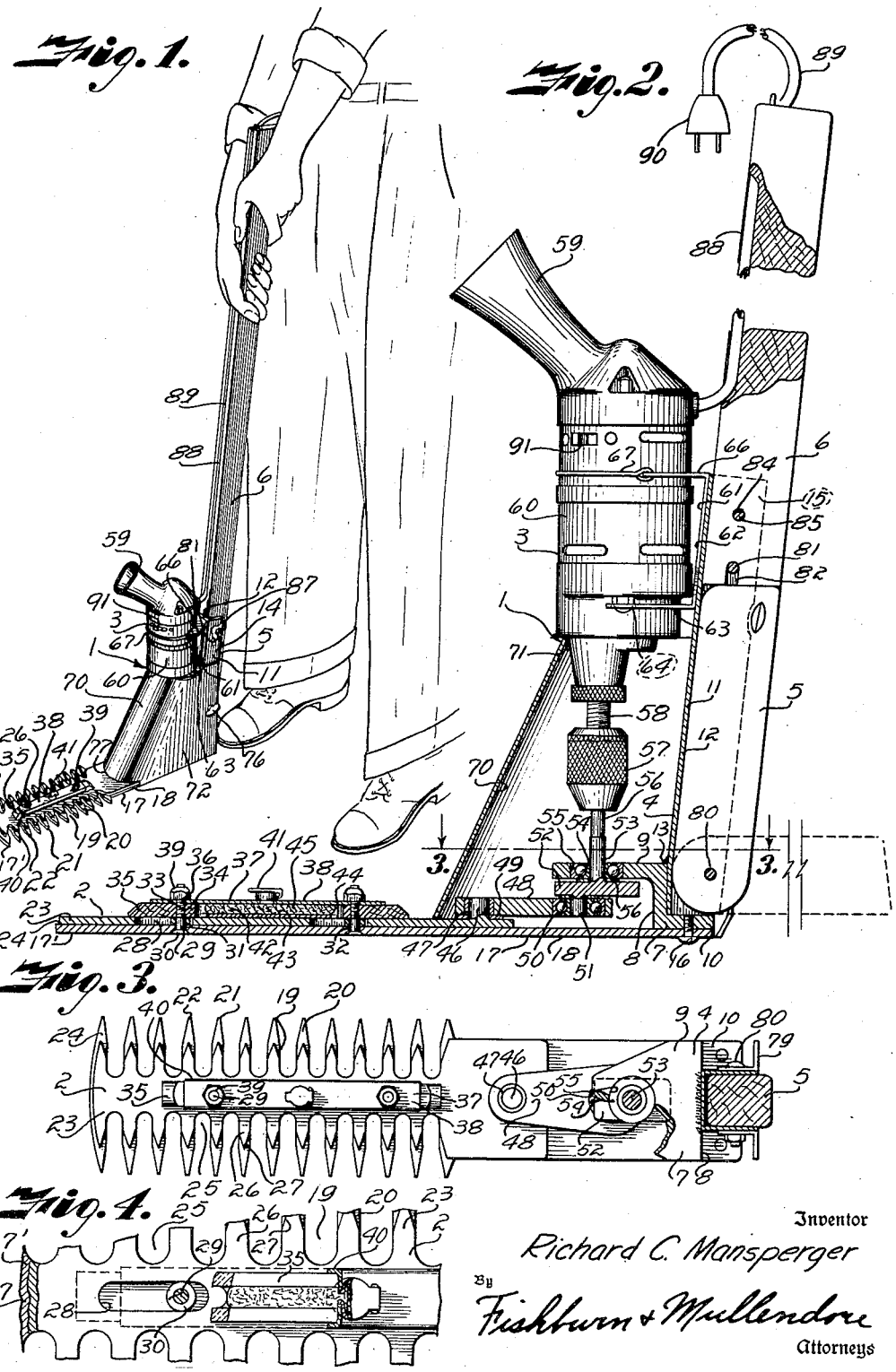

Inventor
Richard C. Mansperger
By Fishburn & Mullendore
Attorneys

Patented July 10, 1951

2,559,725

UNITED STATES PATENT OFFICE 2,559,725

TRIMMING DEVICE

Richard C. Mansperger, North Kansas City, Mo.

Application April 30, 1949, Serial No. 90,737

4 Claims. (Cl. 30—216)

This invention relates to trimming devices and more particularly to a power operated device for cutting grass, shrubs, hedge and the like.

The objects of the invention are to provide a light weight trimming device having an electric motor driven reciprocating blade cooperating with a stationary blade, all supported on a frame having a handle whereby the device may be moved around trees and the like to cut the grass and otherwise trim a lawn; to provide a trimming device in which the reciprocating blade is driven by a conventional electric drill removably mounted on the frame whereby said drill may be quickly and easily removed for conventional use; to provide a hinged handle on the frame which may be used in conjunction with the conventional handle on the drill for holding the devices while trimming hedge, shrubs and the like; to provide a cutter bar for the trimming device which may be grasped or accidentally come in contact with the person without injuring same; to provide a trimming device in which all of the operating parts except the reciprocating blade are enclosed; and to provide a simple, sturdy, economically manufactured trimming device having various handle arrangements and driven by a conventional drill whereby the device is flexible in operation and efficient in trimming grass and various shrubs around a lawn, various parts being quickly removable for ease of cleaning and permitting of the use of the drill for other purposes.

In accomplishing these and other objects of the present invention, I have provided improved details of structure, the preferred forms of which are illustrated in the accompanying drawings, wherein:

Fig. 1 is a perspective view of the trimming device illustrating the position for use in cutting grass.

Fig. 2 is a vertical section through the trimming device.

Fig. 3 is a horizontal sectional view through the trimming device on the line 3—3, Fig. 2, with the housing removed.

Fig. 4 is a fragmentary plan view of the cutter bar with portions broken away to better illustrate the lubrication therefor.

Fig. 5 is a perspective view of the trimming device with the hinged handle in position for use in conjunction with the handle on the drill for holding the device to trim hedge and the like.

Fig. 6 is a disassembled perspective view of the respective parts of the trimming device.

Figures 5, 6:
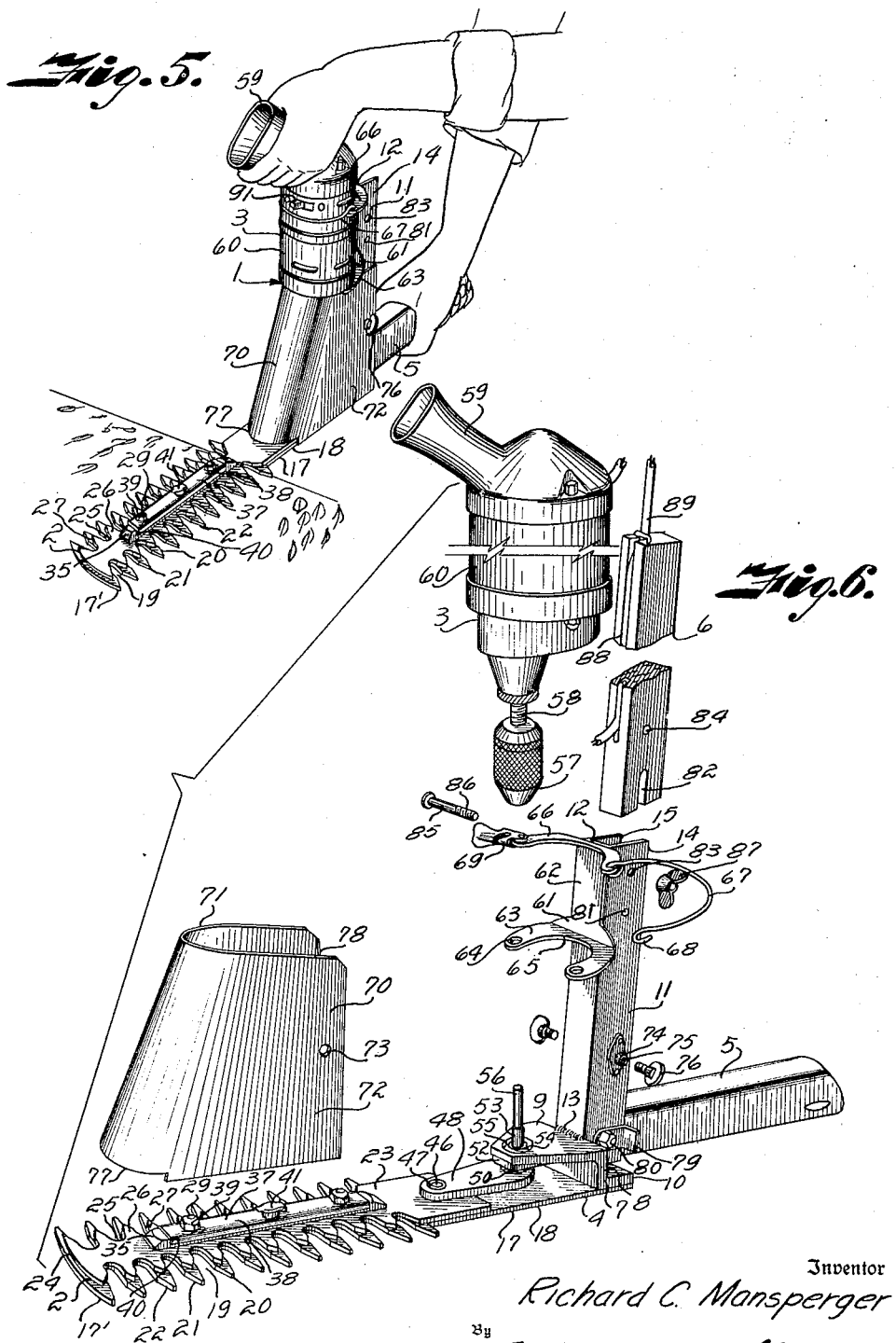

Referring more in detail to the drawings:

1 designates a trimming device generally consisting of cutting mechanism 2, driven by a motor 3 and supported on a frame 4 to which are connected handle members 5 and 6. The frame 4 preferably consists of a substantially Z-shaped member 7 having a vertical web 8 connecting oppositely directed horizontal upper and lower flanges 9 and 10. Extending upwardly and sloping slightly in the direction of the flange 10 is a channel-shaped member 11, the web 12 of which is centrally positioned relative to the web 8 and welded thereto as at 13. The flanges 14 and 15 extend from the web 12 in the same direction as the flange 10 and have their lower ends resting on the upper surface of the flange 10 and suitably secured thereto as by welding, said channel member 11 being of suitable length to mount the motor 3 and handles 5 and 6 as later described.

Secured to the lower face of the flange 10 by suitable fastening devices, such as screws 16, is a stationary flat metal cutter blade 17, said blade extending from the Z-shaped member 7 in the same direction and parallel to the flange 9. The outer or forward end portion of the blade 17' is preferably wider than the rear portion 18 and provided with a plurality of spaced cutout portions 19 to form teeth 20 along each edge of the wider or cutting portion 21 of said blade, said teeth being perpendicular to the side edges of the blade member and having their outer ends tapered substantially to a point as at 22. The cutout portions extend well into the blade whereby the portion between the cutout portions on the opposite sides of the blade is considerably narrower than the width of the blade portion adjacent the Z-member 7.

A movable cutting blade 23 is slidably mounted on the upper face 24 of the blade member 17, said movable blade being reciprocable longitudinally of the blade 17 and longer than the cutting portion 21 thereof. The movable blade is preferably of flat metal substantially the same width as the rear portion of the stationary blade, the outer or forward end of said movable blade being provided with spaced cutout portions 25 in the side edges forming spaced teeth 26 on each side of the movable blade. The teeth 26 are preferably parallel with the teeth 20 and have tapered sides forming points 27. The pitch of the teeth of both of the blades is substantially the same and the length of the toothed portion of each of the blades substantially corresponds as illustrated in Fig. 3. Also the length of the teeth on the movable blade are preferably approximately one-half the length of the teeth on the stationary blade, and the cutout portion forming the teeth is less than the width of a person's finger whereby if a person grasps the stationary blade while the movable blade is reciprocating there is little danger of severe injury. The movable blade preferably is provided with spaced slots 28 in the longitudinal center thereof, said slots being of suitable size to receive and slidably engage spacers 29 mounted on the shanks of screws 30 extending through aligned apertures 31 and 32 in the stationary blade and spacer respectively. The upper ends of the shanks of the screws 30 are preferably threaded as at 33 and extend through apertures 34 in a bearing block 35, said bearing block preferably being made of hard wood or other suitable material. The threaded shanks 33 extend through apertures 36 in the web 37 of a channel member 38 and threaded on said shanks are nuts 39 to hold the web 37 and bearing member 35 in desired relationship to the movable blade to apply suitable pressure thereon to hold same in engagement with the upper face 24 of the stationary blade, yet permit free reciprocation thereof. The flanges 40 of the channel member 38 extend downwardly along the sides of the bearing member 35 to aid in retaining same in position.

In order to lubricate the blades, there is an oil fitting 41 mounted in the web 37 of the channel member 38 to provide communication with a recess 42 in the bearing member between the screws 30. The recess extends downwardly in the upper portion of the bearing member and terminates as at 43 in spaced relation to the bottom of the bearing member, apertures 44 being provided in the ends of the recess to provide communication from the recess to the upper surface of the movable blade. Felt, or other oil absorbing material 45 is preferably located in the recess to retain oil therein. Adjacent the rear end of the movable blade is an upwardly extending trunnion 46 adapted to extend into a bearing 47 carried in one end of a pitman arm 48, a suitable washer 49 preferably being positioned between the upper surface of the movable blade and the pitman. The opposite end of the pitman is provided with a bore having an antifriction bearing 50 fixed therein, the inner face of said bearing being pressed on a crank pin 51 of a crank member 52 located below the flange 9 and having an upwardly extending shaft 53 extending through and pressed into the inner race of an antifriction bearing 54 which is fixed in a bore 55 in the flange 9. A washer 56 is preferably located between the bearings 51 and 54 and the crank member 52 to suitably space same. The shaft 53 extends above the flange 9 and preferably has its upper end 56 of reduced diameter adapted to be received and secured in a chuck 57 carried on the lower end of a driven shaft 58 of the motor 3.

The motor 3 is preferably a conventional electric drill, the housing of which includes a handle member 59 at the opposite end from the chuck 57. The motor housing 60 is preferably removably mounted adjacent the upper end of the channel member 11. The mounting of the motor is preferably by means of a bracket 61 having a vertical portion 62 suitably secured to the web 12 as by welding or the like, the lower end of said vertical portion terminating in outwardly directed spaced arms 63 adapted to extend around a portion of the housing 60 and arranged whereby some part of the housing will rest on the upper surfaces of said arm. In the illustrated structure there are bolt heads on each side of the motor housing which rest in apertures 64 adjacent the ends of the arms 63. The shape of the bracket between the arms is preferably arcuate as at 65, or other suitable shape to engage the periphery of the motor housing. The upper end of the bracket terminates adjacent the upper end of the channel 11 and has outwardly extending spaced arms 66 extending around a portion of the motor housing, one of said arms having the end of a wire clip 67 pivotally mounted therein whereby the wire clip extends around the motor with the opposite end provided with a hook 68 adapted to be engaged by a suitable latch 69 pivotally mounted on the end of the other arm 66 to securely hold the motor housing in engagement with the portion of the bracket between the spaced arms 63 and 66.

A suitable housing 70 is preferably formed of sheet metal bent in a U-shape whereby the upper portion 71 engages under a suitable portion of the motor housing 60 and the sides 72 of said housing extend rearwardly to overlie the flanges 14 and 15 of the channel 11, said sides having apertures 73 adapted to align with bosses 74 having threaded bores 75 whereby thumb screws 76 extend through the apertures 73 and are threaded into the bores 75 to secure the housing onto the channel. The forward or curved end of said housing slopes downwardly and outwardly to provide clearance for movement of the forward end of the pitman arm 48, the lower edge 77 of the housing having clearance with the movable blade so as not to interfere with the reciprocation of same but being sufficiently close to keep grass or other material from the crank and pitman structures. The lower edges of the side members 72 extend downwardly on each side of the rear portion of the stationary blade and the Z-shaped member 7. The rear edges of the side members 72 are preferably turned inwardly to form flanges 78 adapted to engage lugs 79 suitably mounted adjacent the lower end of the channel 11 to aid in positioning the housing.

A bolt 80 extends through the flanges 14 and 15 to provide a pivotal mounting for the handle 5, said bolt preferably being adjacent the lower end of the channel 11 whereby said handle member extends upwardly therefrom and is enclosed between the flanges 14 and 15 when not in use, but may be hinged downwardly to project rearwardly of the cutting mechanism as illustrated in Fig. 5 whereby the device may be held by the handle 59 and handle 5 as when cutting hedge and the like. When the handle 5 is turned upwardly into the channel 11, the upper ends thereof terminate short of the upper end of the channel and spaced above said upper end and extending between the flanges 14 and 15 is a pin 81 adapted to engage in a slot 82 in the lower end of the handle 6. Adjacent the upper end of the channel 11 are aligned apertures 83 in the flanges 14 and 15 which align with an aperture 84 in the handle 6 to receive a bolt 85 having a threaded shank 86, a wing nut 87 being threaded on the threaded shank to secure the bolt in place whereby the pin 81 and bolt secure the handle 6 to the channel 11. The handle 6 is preferably of sufficient length that a person can grasp the upper portion thereof and standing in an upright position move the cutting members along the ground to cut grass. The forward edge of the handle 6 is preferably provided with a groove 88 to receive an electrical conduit 89 therein, the terminal end of said conduit having a suitable connection member 90 adapted to be connected with a suitable source of electric current to supply current to the motor 3.

In operating a device constructed as described, the connection 90 is connected to a suitable source of electric current and a switch 91 on the motor operated to energize said motor, turning the shaft 58 to drive the crank shaft 53 and rotate the crank member 52 and the crank pin thereon, reciprocating the pitman 48 to reciprocate the movable blade 23. The upper end of the handle member 6 is then grasped by the person as shown in Fig. 1, whereby the blades may be moved adjacent the ground to cut grass as when trimming around trees, bushes, along a terrace or in depressions which are otherwise difficult to mow. The reciprocation of the blade 23 moves the teeth of the movable blade across the teeth 20 of the stationary blade, the length of movement of the movable blade being not less than the pitch of the teeth. Oil placed in the oil fitting 41 saturates the felt 45 whereby the oil gradually moves through the apertures 44 to lubricate the contacting surfaces of the blade 23 and bearing member 35, part of the oil moving through the slots 28 to lubricate the contacting faces of the stationary and movable blades.

When it is desired to trim hedge, shrubbery and the like, the wing nut 87 is removed to permit the bolt 85 to be drawn from the apertures 83 and 84 whereby the handle 6 may be lifted to disengage same from the pin 81, permitting complete removal of said handle. The handle 5 is then grasped and hinged backwardly to the position shown in dotted lines in Fig. 2, then by the user grasping the handle 5 and the handle 59 on the motor housing as shown in Fig. 5, the cutting members may be moved across the hedge or other shrubbery to trim same, the operation of the cutting element being the same as with the longer handle, the housing 70 protecting the user from contact with the pitman and crank members and also preventing grass or other material from clogging same.

When the device is not needed for trimming purposes, the screws 76 may be removed to release the housing 70 whereby same may be removed from the device, then by disengaging the chuck 57 from the shaft 53 and by releasing the latch 69 from the hook 68 on the wire clip 67 the motor 3 may be removed from the device whereby it is usable as an electric drill or for other conventional purposes thereof.

It is believed obvious that I have provided an improved trimming device which is flexible in operation, economical to manufacture and capable of efficient, safe trimming of grass, hedge, shrubbery and the like.

What I claim and desire to secure by Letters Patent is:

1. A trimming device comprising, a frame including an upwardly extending channel, a flat elongated stationary cutter blade having one end secured to the bottom of the frame, teeth in the side edges of said stationary blade, a movable cutter blade sliding on the upper surface of the stationary blade, teeth in the side edges of said movable blade, a crank shaft rotatably mounted in the frame perpendicularly to the blade, a crank pin on said crank shaft and eccentric to the axis of rotation, a pitman having one end pivotally connected to the movable blade and the other end rotatably mounted on the crank pin, a motor removably secured to the frame and having a vertically arranged driving shaft on the lower end thereof, a handle on the motor and extending therefrom, means on said motor shaft for effecting driving connection with the crank shaft whereby operation of the motor effects reciprocation of the movable blade to shear material between the teeth of the blades, and a handle in the upwardly extending channel having one end pivotally mounted adjacent the lower end thereof and adapted to be swung from the channel to extend therefrom oppositely to the cutter blade for use with the handle on the motor for manipulating the trimming device.

2. A trimming device comprising, a frame having an upwardly extending channel portion, a frame having an upwardly extending channel portion, a flat elongated stationary cutter blade having one end secured to the bottom of the frame, teeth in the side edges of said stationary blade, a movable cutter blade sliding on the upper surface of the stationary blade, teeth in the side edges of said movable blade, a crank shaft rotatably mounted in the frame perpendicularly to the blade, a crank pin on said crank shaft and eccentric to the axis of rotation, a pitman having one end pivotally connected to the movable blade and the other end rotatably mounted on the crank pin, a motor removably secured to the frame and having a vertically arranged driving shaft on the lower end thereof, a handle on the motor and extending therefrom, a handle removably mounted in the upper portion of said channel portion of the frame and extending upwardly therefrom, a chuck on said motor shaft for effecting driving connection with the crank shaft whereby operation of the motor effects reciprocation of the movable blade to shear material between the teeth of the blades, a handle in the channel portion of the frame and having one end pivotally mounted adjacent the lower end thereof and adapted to be swung from the channel portion to extend therefrom oppositely to the cutter blade, and a housing on the frame for enclosing the chuck, crank shaft and pitman.

3. A trimming device comprising, a Z-shaped frame, a flat elongated stationary cutter blade having one end secured to the bottom of one of the flanges of the Z-shaped frame and extending therefrom in the direction of the other flange, a channel member secured to the Z-shaped frame and extending upwardly therefrom with the channel opening oppositely to the cutter blade, a movable cutter blade sliding on the upper surface of the stationary blade, a crank shaft rotatably mounted in said other flange of the Z-shaped frame perpendicularly to the blades, a crank pin on said crank shaft and eccentric to the axis of rotation, a pitman having one end pivotally connected to the movable blade and the other end rotatably mounted on the crank pin, a motor including a driven shaft operated thereby, spaced arms on the channel member adjacent the upper end thereof and engaging the motor, means removably securing the motor to the arms with the driven shaft substantially coaxially of the axis of the crank shaft, means drivingly connecting the motor driven shaft with the crank shaft, said motor having a handle thereon extending oppositely of the channel member, and a handle having one end pivoted adjacent the lower end of the channel member and extending therefrom oppositely of the cutter blade, said handle being adapted for folding into the channel.

4. A trimming device comprising, a Z-shaped frame, a flat elongated stationary cutter blade having one end secured to the bottom of one of the flanges of the Z-shaped frame and extending therefrom in the direction of the other flange, a channel member secured to the Z-shaped frame and extending upwardly therefrom with the channel opening oppositely to the cutter blade, a movable cutter blade sliding on the upper surface of the stationary blade, a crank shaft rotatably mounted in the other flange of the Z-shaped frame perpendicularly to the blades, a crank pin on said crank shaft and eccentric to the axis of rotation, a pitman having one end pivotally connected to the movable blade and the other end rotatably mounted on the crank pin, a motor removably mounted on the channel member adjacent the upper end thereof, said motor having a handle thereon extending oppositely of the channel member, means drivingly connecting the motor shaft with the crank shaft, a handle having one end pivoted adjacent the lower end of the channel member and extending therefrom oppositely of the cutter blade, said handle being adapted for folding into the channel, a housing between the motor and cutter blades for enclosing the crank shaft and pitman, and means securing the housing to the channel member for supporting said housing thereon.

RICHARD C. MANSPERGER.

REFERENCES CITED

The following references are of record in the file of this patent:

UNITED STATES PATENTS

| Number | Name | Date |
|---|---|---|
| 1,357,364 | Van Bree | Nov. 2, 1920 |
| 1,411,440 | Kocourek | Apr. 4, 1922 |
| 1,485,250 | Standinger | June 12, 1923 |
| 1,681,688 | Simescu | Aug. 21, 1928 |
| 1,832,993 | Masek | Nov. 24, 1931 |
| 1,902,114 | Beanblossom | Mar. 21, 1933 |
| 1,937,586 | Ortt | Dec. 5, 1933 |
| 2,256,779 | McHenry | Sept. 23, 1941 |
| 2,351,460 | Shelton | June 13, 1944 |
| 2,458,200 | Renfroe | Jan. 4, 1949 |